United States Patent [19]

Clay

[11] Patent Number: 5,141,239
[45] Date of Patent: Aug. 25, 1992

[54] SCROLL CHUCK FOR LATHE

[76] Inventor: Tymen Clay, 280 Huntingdon Avenue, Stratford, Ontario, Canada, N5A 6P9

[21] Appl. No.: 723,944

[22] Filed: Jul. 1, 1991

[51] Int. Cl.$^5$ .......................................... B23B 31/163
[52] U.S. Cl. .................... 279/114; 279/123; 279/125
[58] Field of Search ............... 279/114, 125, 123, 115, 279/116, 157, 110

[56] References Cited

U.S. PATENT DOCUMENTS

| | | | |
|---|---|---|---|
| 3,704,022 | 11/1972 | Blattry et al. | 279/110 X |
| 4,007,943 | 2/1977 | Scharfen et al. | 279/125 X |
| 4,026,566 | 5/1977 | Röhm | 279/121 |
| 4,640,518 | 2/1987 | Ferraro | 279/110 X |

FOREIGN PATENT DOCUMENTS 3100908 9/1982 Fed. Rep. of Germany ...... 279/110

OTHER PUBLICATIONS

Nova 4-Jaw Chuck, in *The Woodturners Catalog* 1990/91 from Craft Suppolies U.S.A., Provo, Utah. Pages 14 & 15.

*Primary Examiner*—Steven C. Bishop
*Attorney, Agent, or Firm*—Kramer, Brufsky Cifelli

[57] ABSTRACT

An improved scroll chuck for holding a workpiece in a lathe including a jaw holder having a front side and a rear side, radially extending slots in the front side and means for attaching the holder to the lathe for turning about a central axis. Two or more jaw devices are mounted in the slots and are radially movable therein. A scroll member is rotatably mounted on the holder and has a spiral-shaped rib formed on a front surface thereof. This rib extends along recesses formed on the jaw devices whereby rotation of the scroll member causes the jaw devices to move in the radial direction. A pin member is arranged on one of the jaw devices and extends from a rearwardly facing surface of the device and into an elongate recess formed in the holder. This pin member prevents the jaw device from accidentally disengaging from the holder.

20 Claims, 2 Drawing Sheets

SCROLL CHUCK FOR LATHE

BACKGROUND OF THE INVENTION

This invention relates to chucks for holding a workpiece in a machine such as a lathe.

A variety of chucks or gripping devices are known in the machine and tool industry for holding a workpiece or a toolbit. Many of these chucks have movable or sliding jaws which can be moved radially inwardly or outwardly in order to hold or grip the end of a workpiece or a toolbit. These jaws are sometimes moved by means of a special tool or key that is turned manually.

One common form of chuck used with a lathe is called a scroll chuck which can be of the self-centering type. The number of jaws can vary from as few as two to as many as six or more but most commonly these chucks have three jaws that can be moved radially inwardly or outwardly by means of an annular scroll member that is turned about a central axis in order to maneuver the jaws. Scroll chucks have several advantages including versatility, good gripping force and ease of use. Often chucks of this type have a wide range of jaw movement enabling them to hold the ends of both small and large workpieces and they can be made to fit a variety of lathes.

However there is a serious disadvantage with scroll chucks made in the usual manner and this has restricted their use in some fields and for some applications. The difficulty arises when the scroll chuck has its jaws moved to the example, the individual jaws are arranged in a particular outermost position. In the case of a four jaw chuck, for order in order that they will advance properly in the slots of the jaw holder. The last jaw, jaw no. 4 is the final jaw to be engaged by the rib or scroll on the scroll member when the jaws are at their outermost position. If the jaw members are not checked prior to the startup of the lathe and the scroll member has not been properly advanced, there is a danger that one or more of the jaw members and in particular the fourth jaw member will not be properly engaged by the scroll member and will fly out of the chuck as soon as the lathe begins to operate. A jaw when thrown in this manner of course presents a considerable danger to any persons adjacent to the lathe.

The applicant is aware of only one previous attempt at solving this known problem with scroll chucks. In particular it is known to provide on at least the fourth jaw an inwardly projecting tab on the radially inner end of this jaw. The difficulty with this solution is that the tab seriously restricts the capacity of the scroll chuck. It also necessitates that the jaw device having the tab be disassembled in order for the jaws to be removed from the jaw holder.

It is an object of the present invention to provide an improved scroll chuck wherein the possibility of one or more jaws of the chuck becoming accidentally disengaged from the jaw holder is substantially reduced.

It is a further object of the invention to provide an improved scroll chuck provided with a jaw retention device on one of the jaws, which retention device extends into an elongate recess formed in the jaw holder and prevents the jaw device from disengaging from the jaw holder when the jaw devices have been moved to an outer position.

SUMMARY OF THE INVENTION

According to one aspect of the invention, a scroll chuck for holding a workpiece in the lathe includes a jaw holder having a front side facing in the direction of the workpiece and a rear side. This holder has radially extending slots formed in its front side and means for attaching the holder to the lathe for turning about a rotation axis. The chuck also has jaw devices mounted in respective slots of the holder and moveable along the slots. A scroll member is mounted on the holder for moving the jaw devices along their respective slots by means of rotation of the scroll member. A jaw retention member is provided on one of the jaw devices and it extends into an elongate recess formed in the jaw holder. The retention member prevents the jaw device having same from disengaging from the jaw holder when the jaw devices have been moved to an outer position by the scroll member.

Preferably the elongate recess runs parallel to the slot for the jaw device having the retention member.

According to another aspect of the invention, a scroll chuck for holding a workpiece in a lathe includes a jaw holder comprising a front side facing in the direction of the workpiece, radially extending slots in this front side and means for attaching the holder to the lathe for turning about a central axis. Jaw devices are detachably mounted in their respective slots of the holder and are radially movable therein. A scroll member is rotatably mounted on the holder and has a spiral-shaped rib formed on a front surface thereof. This rib extends along recesses formed on the jaw devices Whereby rotation of the scroll member about the central axis causes the jaw devices to move radially inwardly or outwardly. A pin member is arranged on one of the jaw devices and extends from a rearwardly facing surface of the jaw device and into an elongate recess formed in the jaw holder. This pin member normally prevents the jaw device having the pin member from disengaging from the jaw holder when the jaw devices are moved to their outermost position by the scroll member.

In a preferred embodiment of this scroll chuck there are four radially extending slots in the jaw holder and four jaw devices mounted in these slots.

Further features and advantages will become apparent from the following detailed description taken in conjunction with the accompanying drawings.

DETAILED DESCRIPTION OF PREFERRED EMBODIMENT

Figure 1:
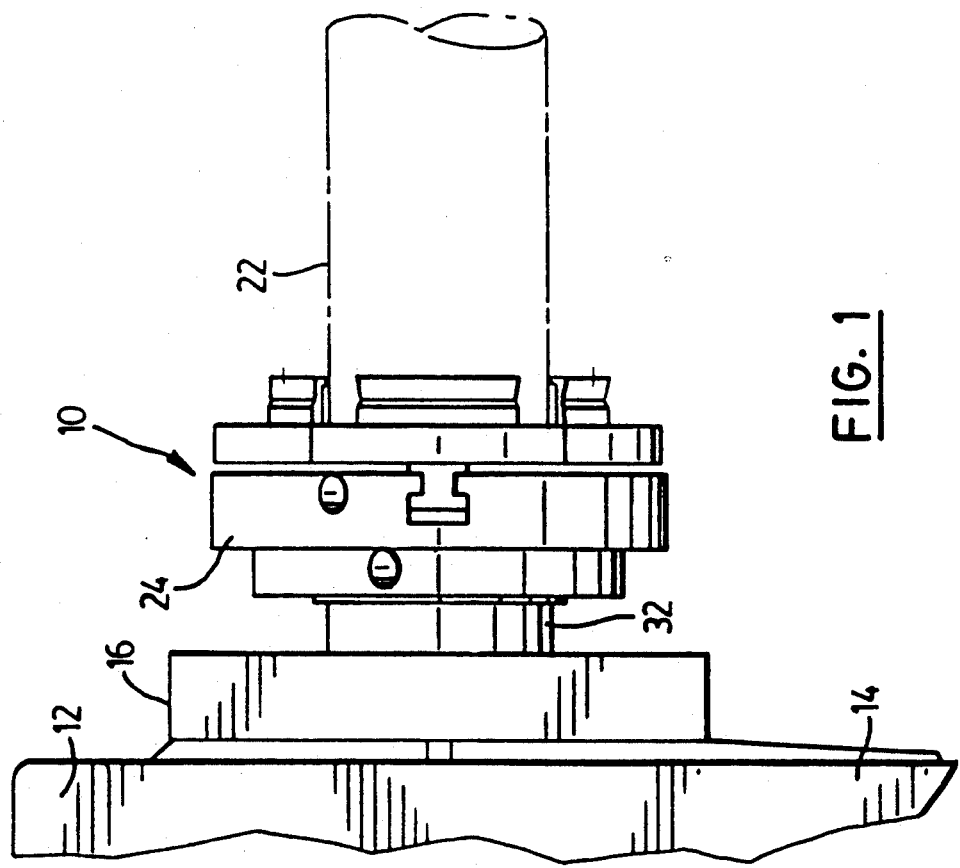
FIG. 1 is a side view of a scroll chuck constructed in accordance with the invention mounted on a lathe, only a portion of which is shown.

As shown in FIG. 1 a scroll chuck 10 constructed in accordance with the invention is mounted on a rotatable shaft of a lathe 12. Only a portion of the lathe housing 14 is shown in FIG. 1. The lathe shaft extends outwardly from the centre of the bearing support 16. The lathe itself is of the usual construction and forms no part of the present invention. The projecting end of the shaft of the lathe can be threaded for attachment to the scroll chuck 10.

The illustrated scroll chuck 10 includes a jaw holder 18 having a front side 20 facing in the direction of the workpiece 22 indicated in dashed lines in FIG. 1. The holder also has a rear side 24. The illustrated holder also has four radially extending slots 26 to 29 but it will be understood that the holder can have as few as two and as many as 6 or more slots depending upon the number of jaws or jaw devices in the scroll chuck. The slots extend to a circular central opening 30. The holder includes means for attaching the holder to the lathe for turning about a central axis. The illustrated attaching means comprises a sleeve section 32 which is internally threaded at 34 for attachment to the shaft of the lathe. Preferably the sleeve 32 is provided with a small threaded opening 36 provided for a set screw to secure the chuck on the lathe shaft. The sleeve section 32 extends rearwardly from the wider front section 34 of the holder.

Figure 3:
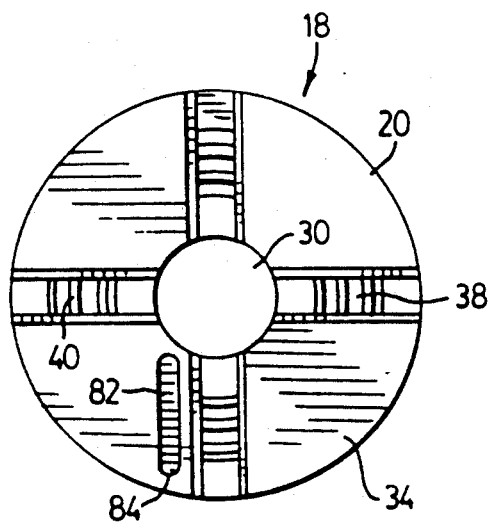
FIG. 3 is a front view of the jaw holder from which the four jaws that are shown in FIG. 2 have been removed for purposes of illustration.
Figure 4:
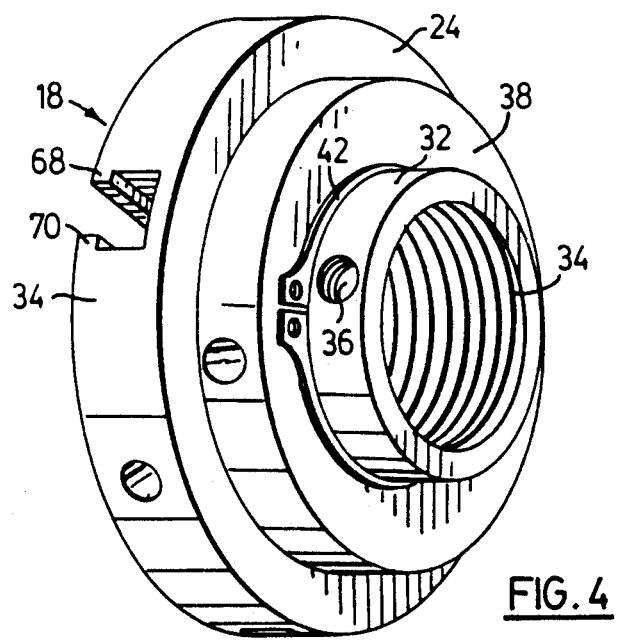
FIG. 4 is a perspective view showing the rear side of the jaw holder of FIG. 3.

A scroll member 38 of known construction is rotatably mounted on the sleeve section 32. The scroll member 38 has a spiral-shaped rib 40, portions of which can be seen through the radial slots of the holder in FIG. 3. This rib is formed on a front surface of the scroll member 38 and it engages the jaw devices as explained hereinafter so that rotation of the scroll member about the central axis causes the jaw devices to move radially inwardly and outwardly. The scroll member is held in position on the sleeve section by means of a split ring 42 located at the rear thereof, which ring fits into an annular groove formed in the sleeve section.

Figure 2:
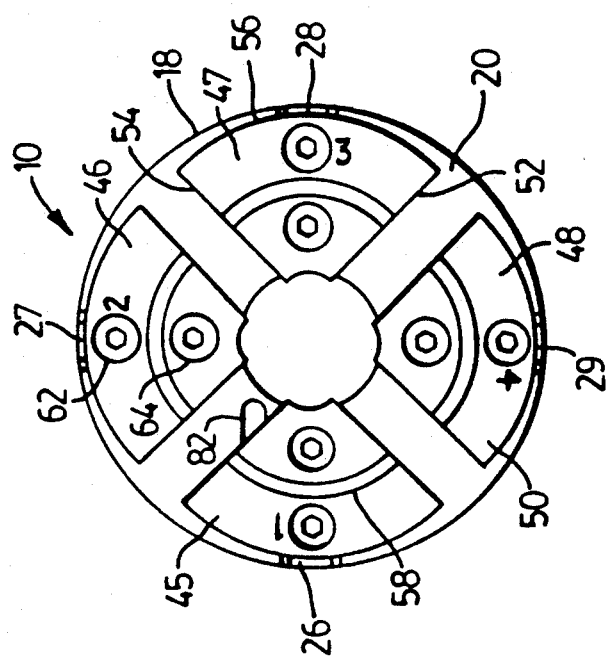
FIG. 2 is front view of the scroll chuck provided with the improvement of the invention.
Figure 5:
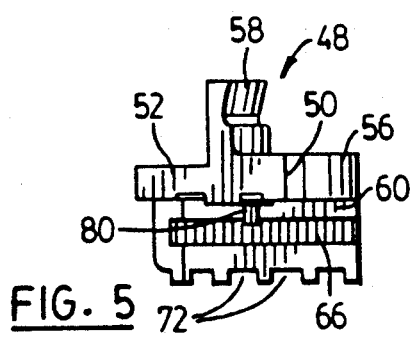
FIG. 5 is a side elevation of a single jaw device constructed in accordance with the invention.
Figure 6:
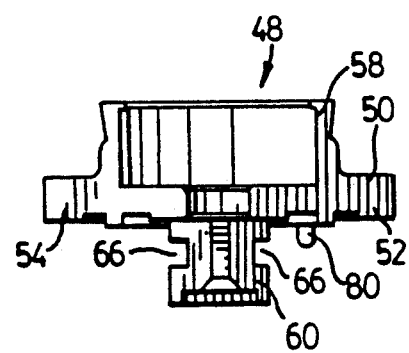
FIG. 6 is another view of the jaw device of FIG. 5 taken from the lefthand side of FIG. 5.

In the illustrates scroll chuck there are four jaw devices 45 to 48. Except for one important modification, these four jaw devices are constructed in a known manner and are very similar to one another. The construction of these jaw devices will be described with reference to FIGS. 2, 5 and 6, the latter two figures illustrating jaw no. identified by reference 48. Each of these jaw devices is detachably mounted in its respective slot and is radially movable therein by rotating the scroll member 38. Preferably each jaw device comprises a first jaw member 50 which is the portion that is seen in FIG. 2. The first jaw member 50 is located forwardly of the jaw holder 18. In the illustrated embodiment, each jaw device has two substantially radially extending side Walls 52 and 54. It also has an arc-shaped outer side wall 56 which extends between the two side walls 52 and 54. The illustrated first jaw member 50 also has a forwardly extending arc-shaped flange 58 which is used to grip the workpiece. It will be understood that the first jaw member 50 is located entirely outside the adjacent slot of the jaw holder. There is also a second jaw member 60 which is detachably connected to the first jaw member by means of two screws 62 and 64, the heads of which can be seen in FIG. 2. The screws extends into suitable threaded holes formed in the second jaw member 60. The screws can be loosened or removed by means of a suitable turnkey or screwdriver. It is the second jaw member 60 which is located in the respective slot of the jaw holder and which is slidable therein. The radially extending sides of the second jaw member 60 are formed with grooves 66. In these grooves are positioned two edge flanges 68 and 70 that extend along each slot of the jaw holder and that retain the jaw member 60 in the slot. There are also formed on the bottom or rear surface of each jaw member 60 several slightly curved recesses 72. The aforementioned rib 40 on the scroll member extends along these recesses 72. Accordingly rotation of the spiral-shaped rib about the central axis will force the jaw devices either inwardly or outwardly as required. As explained above, there is the danger with previously used scroll chucks that one or more of the jaw devices, particularly jaw device no. 4 will not be engaged properly by the rib 40 when the jaw devices have been moved to their outermost position This is due to the fact that the rib 40 may fail to extend through any of the recesses 72 formed on the rear surface of jaw device no. 4.

The present invention provides jaw retention means provided on at least one of the jaw devices. If the retention means is provided on only one jaw device, it is provided on jaw device no. 4, that is the last jaw device to be engaged by the scroll or rib 40. The preferred retention means is a pin member 80 arranged on a rearwardly facing surface of the first jaw member 50. This pin member extends into an elongate recess 82 formed in the front side of the jaw holder. The recess 82 extends parallel to the adjacent slot 29. Because the recess 82 is closed at its outer end 84, it will be appreciated that the jaw device 48 is normally prevented by the pin member from disengaging from the jaw holder 18 when the jaw devices have been moved to their outermost position by the scroll member 38.

In order to remove the jaw device 48 from its respective slot, the jaw devices are first moved to the maximum outermost position by rotation of the scroll member. The two screws 62 and 64 that hold together the jaw device 48 are then either loosened or removed entirely to permit the first jaw member 50 to be separated from the second jaw member 60 and to permit the pin member 80 to be raised out of the recess 82. The jaw device 48 can then be removed from its respective slot in the usual manner. Note that it is not necessary to remove the screws 62 and 64 entirely as they need only be loosened sufficiently to permit the pin 80 to be pulled away from the jaw holder so as to clear the top of the recess 82. By removing the jaw device in this manner, there is less likelihood of parts being improperly attached or screws being lost.

It will be appreciated that with the present improvement, there is considerably less likelihood of one of the jaw devices and in particular the fourth jaw device in a four jaw chuck from becoming disengaged from the jaw holder upon startup of the lathe. At the same time a full range of movement of the jaw devices in the jaw holder is permitted.

It will be appreciated by those skilled in the art that some modification and changes to the described scroll chuck can be made without departing from the spirit and scope of the present invention. Accordingly all such modifications and changes as fall within the scope of the appended claims are intended to be part of this invention.

I claim:

1. A scroll chuck for holding a workpiece in a lathe comprising:

a jaw holder having a front side facing in the direction of the workpiece and a rear side, radially extending slots in said front side, and means for attaching said holder to said lathe for turning about a central axis;

jaw devices detachably mounted in respective slots of said holder and radially movable therein;

a scroll member rotatably mounted on said holder and having a spiral-shaped rib formed on a front surface thereof, said rib extending along recesses formed on said jaw devices whereby rotation of said scroll member about said axis causes said jaw devices to move radially inwardly or outwardly; and a pin member arranged on one of said jaw devices and extending from a rearwardly facing surface of the jaw device and into an elongate recess formed in said jaw holder, wherein said pin member normally prevents said one jaw device having said pin member from disengaging from said jaw holder when said jaw devices are moved to their outermost position by said scroll member.

2. A scroll chuck according to claim 1 wherein there are four radially extending slots in said jaw holder and four jaw devices mounted in said slots.

3. A scroll chuck according to claim 1 wherein each jaw device comprises a first jaw member located forwardly of the jaw holder and outside the adjacent slot and a second jaw member detachably connected to said first jaw member and located in the respective slot.

4. A scroll chuck according to claim 3 wherein said pin member is arranged on the first jaw member of said one jaw device and said first and second jaw members are connected together by one or more threaded connectors, said pin member being removable from said recess by loosening or removing said one or more threaded connectors.

5. A scroll chuck according to claim 1 wherein said jaw holder comprises a circular front section having a flat front side and said slots and a sleeve section extending rearwardly from said front section and forming said attaching means, said scroll member being rotatably mounted on and extending about said sleeve section.

6. A scroll chuck according to claim 5 wherein there are four equally spaced slots in said front section and four jaw devices mounted in said slots.

7. A scroll chuck according to claim 6 wherein each jaw device comprises a first jaw member located forwardly of and adjacent to said flat front side and a second jaw member detachably connected by threaded connectors to said first jaw member and located in the respective slot.

8. A scroll chuck according to claim 7 wherein said pin member is arranged on a rear surface of said first jaw member of said one jaw device, said pin member being removable from said recess by loosening or removing the threaded connectors of said one jaw device.

9. A scroll chuck for holding a workpiece in a lathe comprising:

a jaw holder having a front side facing in the direction of the workpiece and a rear side, said holder having radially extending slots formed in its front side and means for attaching said holder to said lathe for turning about a rotation axis;

jaw devices mounted in respective slots of the holder and movable along said slots;

scroll means mounted on said holder for moving said jaw devices along their respective slots by means of rotation of said scroll means; and jaw retention means provided on one of said jaw devices, said retention means extending into an elongate recess formed in said jaw holder, wherein said retention means prevents said one jaw device having same from disengaging from said jaw holder when said jaw devices have been moved to an outer position by said scroll means.

10. A scroll chuck according to claim 9 wherein said elongate recess runs parallel to the slot for said one jaw device.

11. A scroll chuck according to claim 10 wherein said elongate recess runs parallel to the slot for said one jaw device.

12. A scroll chuck according to claim 10 wherein each jaw device comprises a first jaw member located forwardly of the jaw holder and outside the adjacent slot and a second jaw member detachably connected to said first jaw member and located in the respective slot.

13. A scroll chuck according to claim 9 wherein said retention means comprises a pin member projecting from a rearwardly facing surface of the one jaw device.

14. A scroll chuck according to claim 12 wherein said retention means comprises a pin member arranged on the first jaw member of said one jaw device.

15. A scroll chuck according to claim 14 wherein said first and second jaw members are connected together by one or more threaded connectors and said pin member is removable from said recess by loosening or removing said one or more threaded connectors.

16. A scroll chuck according to claim 14 wherein said recess is formed in said front side of said jaw holder.

17. A scroll chuck according to claim 14 wherein there are four radially extending slots in said jaw holder and four jaw devices mounted in said slots.

18. A scroll chuck according to claim 15 wherein there are four radially extending slots in said jaw holder and four jaw devices mounted in said slots.

19. A scroll chuck according to claim 10 wherein said jaw holder comprises a circular front section having a flat front side and said slots and a sleeve section extending rearwardly from said front section and forming said attaching means, said scroll means being rotatably mounted on and extending about said sleeve section.

20. A scroll chuck according to claim 19 wherein each jaw device comprises a first jaw member located forwardly of and adjacent to said flat front side and a second jaw member detachably connected by threaded connectors to said first jaw member and located in the respective slot.

* * * * *